United States Patent

[11] 3,548,795

| [72] | Inventor | George R. Howland |
| | | South Bend, Ind. |
| [21] | Appl. No. | 818,510 |
| [22] | Filed | Apr. 23, 1969 |
| [45] | Patented | Dec. 22, 1970 |
| [73] | Assignee | The Bendix Corporation |
| | | a corporation of Delaware |

[54] FLUIDIC FUEL INJECTION SYSTEM FOR COMBUSTION ENGINE
16 Claims, 8 Drawing Figs.

[52] U.S. Cl................................................ 123/119,
123/139, 123/140; 137/81.5; 261/36, 261/69
[51] Int. Cl...................................................... F02m 69/00,
F02d 3/02, F02d 33/00
[50] Field of Search........................................... 123/119,
140.1, 140.3, 139.17, 139.18; 137/81.5;
261/Fluids, 36.1, 69, (Inquired)

[56] References Cited
UNITED STATES PATENTS

| 2,244,669 | 6/1941 | Becker.......................... | 123/140.3 |
| 3,389,894 | 6/1968 | Binder.......................... | 261/36.1 |
| 3,392,714 | 7/1968 | Braun et al. ................... | 123/139.18X |
| 3,491,797 | 1/1970 | Taplin et al.................... | 137/81.5 |

Primary Examiner—Wendell E. Burns
Attorneys—Gordon H. Chenez and Plante, Arens, Hartz, Hix and O'Brien ABSTRACT: Combustion engine fuel injection apparatus having pure fluid control circuitry responsive to ambient and engine exhaust temperature and automatic in operation to control fuel flow injected to the engine cylinders to maintain a maximum engine exhaust gas temperature to optimize engine power and fuel consumption and to control fuel flow to increase the engine fuel-air ratio to a rich condition thereby establishing a predetermined relatively lower engine exhaust gas temperature corrected for ambient temperature during engine maximum power operating conditions.

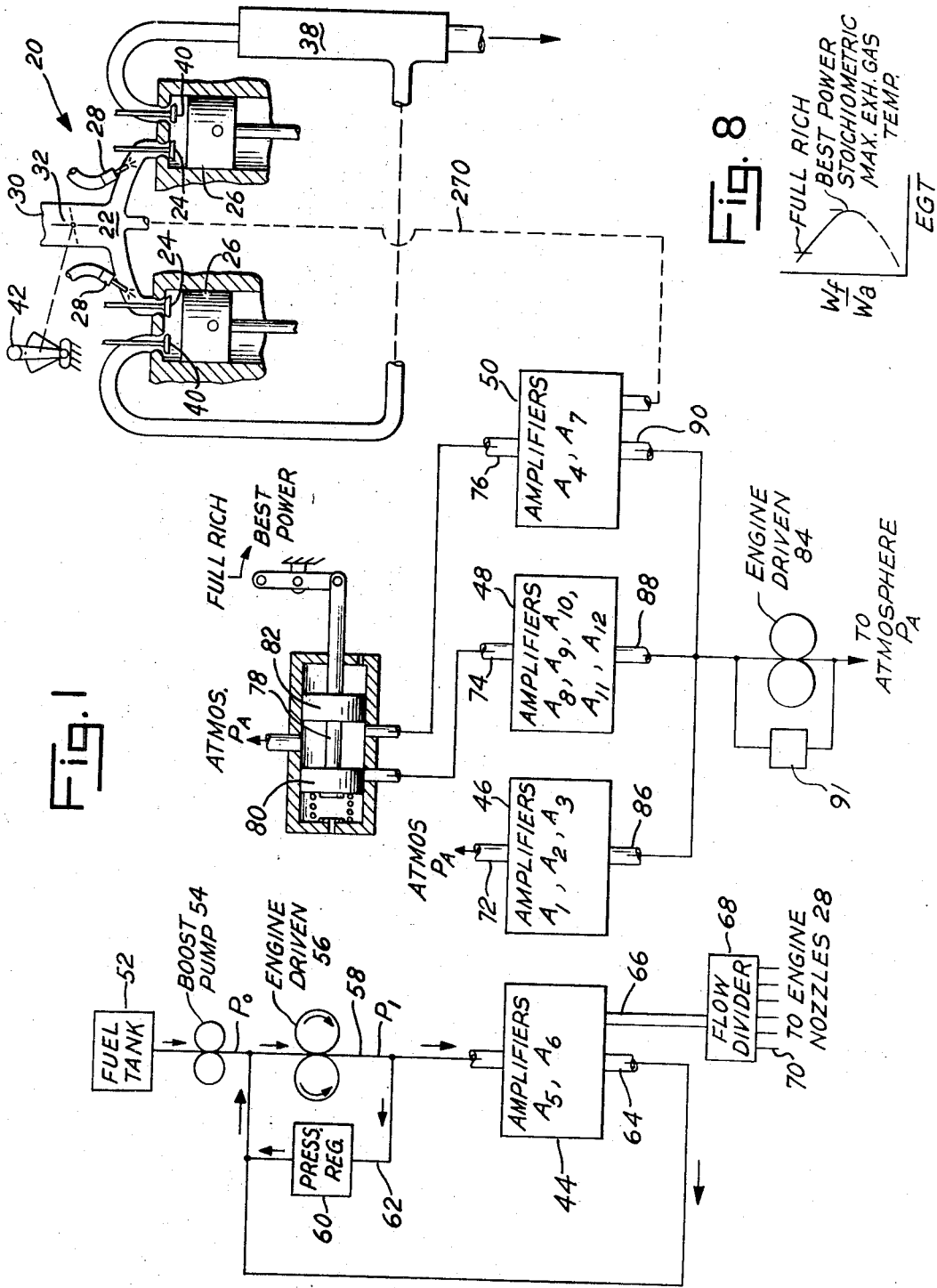

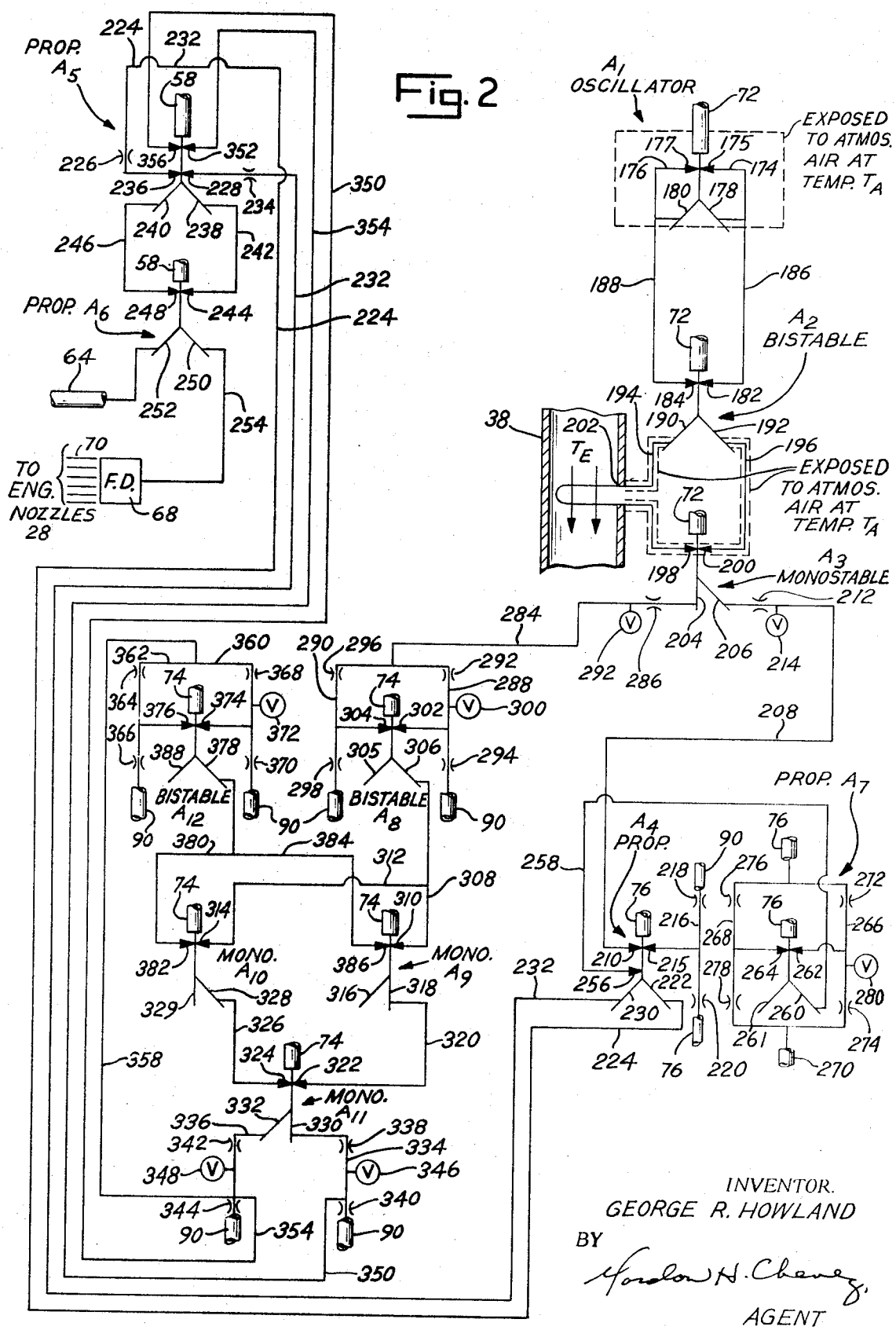

Fig. 3

| CONDITION | | | PRESSURE SIGNAL AT OUTPUT PASSAGE | | | | | RESULTING FUEL FLOW |
|---|---|---|---|---|---|---|---|---|
| FUEL-AIR | FUEL FLOW | $T_E$ | $A_8$ | $A_{12}$ | $A_9$ | $A_{10}$ | $A_{11}$ | |
| LEAN | INCREASE | INCREASE | 306 | 388 | 316 | 329 | 330 | INCREASES |
| RICH | INCREASE | DECREASE | 305 | 388 | 318 | 329 | 332 | DECREASES |
| RICH | DECREASE | INCREASE | 306 | 378 | 318 | 329 | 332 | DECREASES |
| LEAN | DECREASE | DECREASE | 305 | 378 | 318 | 328 | 330 | INCREASES |

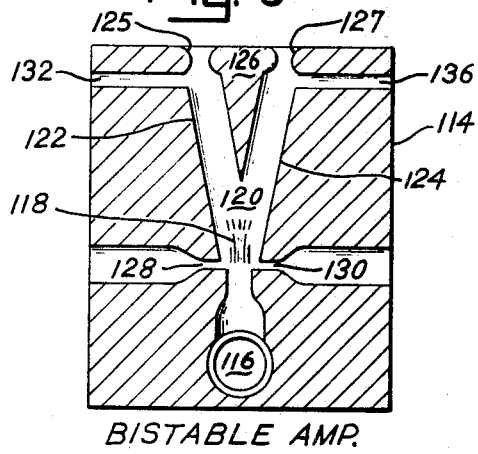

Fig. 5 — BISTABLE AMP.

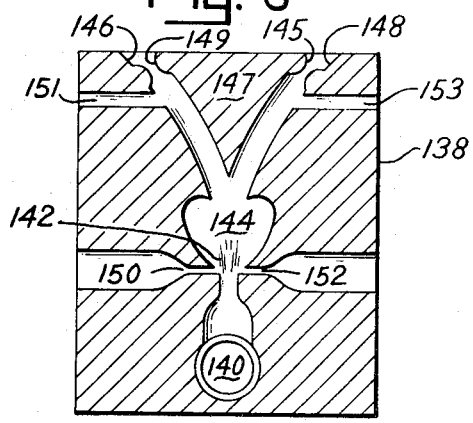

Fig. 6 — PROPORTIONAL AMP.

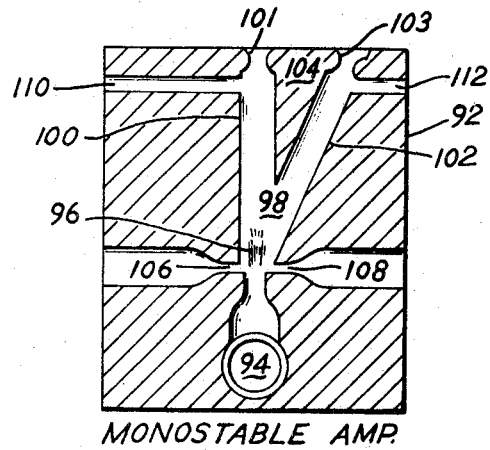

Fig. 4 — MONOSTABLE AMP.

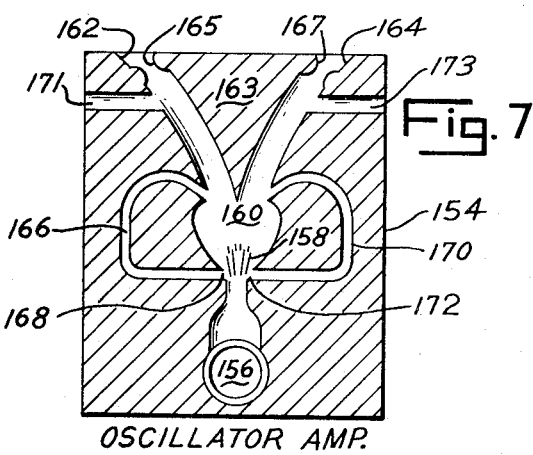

Fig. 7 — OSCILLATOR AMP.

INVENTOR.
GEORGE R. HOWLAND
BY
Gordon H. Chenez
AGENT

FLUIDIC FUEL INJECTION SYSTEM FOR COMBUSTION ENGINE

BACKGROUND OF THE INVENTION

The advantages of direct fuel injection systems for reciprocating engines, particularly of the air cooled light aircraft type, are well known. The basic requirements of a direct fuel injection system include (1) a sufficiently rich fuel-air ratio capable of maintaining low engine cylinder head temperatures during ground operation as well as aircraft takeoff under maximum engine power, (2) control over fuel flow to reduce the fuel-air ratio during aircraft cruise operation thereby minimizing fuel consumption for a given engine power setting, (3) adequate altitude and atmospheric air temperature compensation on fuel flow to maintain a given fuel-air ratio. Existing fuel injection of which I am aware provides the necessary fuel-air ratio for ground running and maximum power engine operation and, in some cases, altitude compensation. However it is rare that a provision is made to compensate for ambient temperature. The fuel-air ratio is reduced manually by the pilot for cruise operation via a fuel mixture control lever.

The conventional practice to optimize fuel consumption requires that the pilot compute his engine power setting based on flight altitude and ambient temperature after which the engine power control lever is manually set to the required power setting and the fuel mixture control lever adjusted to reduce fuel flow to obtain a maximum exhaust gas temperature. Since the usual exhaust gas temperature indicating mechanism has extremely slow response characteristics, adjusting fuel flow to obtain maximum exhaust gas temperature becomes a time consuming operation. Obviously, the entire procedure must be repeated in the event the pilot desires to change flight altitude. It will be recognized that optimum conditions for safety and efficiency of aircraft flight operation necessitate substantially all of the pilot's attention such that his efforts donated to performing the heretofore mentioned engine power setting manipulations are highly undesirable.

A completely automatic control system to perform the above-mentioned power setting would require a hydromechanical control network having a relatively complex system of sensors, logic devices, etc. to perform the necessary computation and control over fuel flow to the engine which, in turn, results in a corresponding bulky and weighty package as well as questionable reliability with increased maintenance problems. Furthermore, a hydromechanical system having such complexity would have a corresponding prohibitive price.

The relatively recent development of sensitive and reliable pure fluid amplifier devices including oscillating, proportional, monostable and bistable types has provided the means whereby automatic fuel injection control apparatus is feasible without the heretofore mentioned undesirable characteristics of a corresponding hydromechanical control.

SUMMARY OF THE INVENTION

Applicant's fully automatic fuel injection system is fluidic in operation and operates on the basis of controlling fuel flow to an engine as a function of exhaust gas temperature. If a combustion engine of the reciprocating type is supplied excess fuel, the cylinders thereof are charged with a rich fuel-air ratio mixture causing incomplete combustion therein which, in turn, results in a corresponding reduction in exhaust gas temperature, and thus engine efficiency. Assuming the mass air flow to the cylinders remains constant, a reduction in fuel flow produces a corresponding decrease in fuel-air ratio in the cylinders which, as the fuel-air ratio approaches stoichiometric, results in an increase in exhaust gas temperature and thus combustion efficiency in the cylinders. Maximum exhaust gas temperature is reached at substantially stoichiometric fuel-air ratio. If fuel flow to the engine is further reduced below that establishing stoichiometric fuel-air ratio, the excess air has a chilling effect on the cylinder combustion process which, in turn, causes a corresponding reduction in exhaust gas temperature. It is not desirable to operate the engine with a below stoichiometric fuel-air ratio since the reduced cylinder temperature has the effect of increasing valve and piston wear thereby reducing engine life as well as available power.

Best power and optimum fuel consumption occurs at or near (on the excess fuel side) of the maximum exhaust gas temperature. Applicant's fuel injection apparatus is adapted to seek a substantially maximum exhaust gas temperature for a best power condition and maintain a reduced exhaust gas temperature corrected for ambient temperature during maximum power operation of the engine. It will be understood that the maximum exhaust gas temperature may not necessarily be a known value. Applicant's fuel injection apparatus is closed loop on temperature thereby providing inherent altitude compensation which, in the case of aircraft, is highly desirable.

For aircraft use, a selector switch may be provided on the instrument panel for manual operation by the pilot or connected to the engine speed control mechanism on engines equipped with a variable pitch propeller. For aircraft takeoff when maximum engine speed is requested and for ground running operation, the selector switch is actuated to a fuel rich position whereupon Applicant's fuel injection apparatus having closed loop exhaust temperature control will function to establish the aforementioned rich fuel-air ratio which results in corresponding cooler engine cylinder operating temperatures.

The pilot, upon reaching cruise altitude, resets the throttle control lever and propeller pitch control lever to approximately the desired engine power setting. The selector switch is manually actuated by the pilot or automatically actuated in the case of a variable pitch propeller to activate the best power fluidic circuitry causing a reduction in fuel flow to the engine as necessary to operate at maximum exhaust gas temperature or closely thereto as desired. The throttle control lever or propeller pitch control lever can be set to obtain the desired fuel flow to the engine which, in turn, results in the engine operating at the desired power setting regardless of altitude or ambient temperature.

It is an object of the present invention to provide a compact lightweight and reliable fuel injection apparatus of the fluidic type for a combustion engine which is fully automatic in operation.

It is another object of the present invention to provide fluidic fuel injection apparatus for a combustion engine of the reciprocating type wherein fuel flow to the engine is controlled by pure fluid control apparatus as a function of sensed exhaust gas temperature to automatically maintain a substantially stoichiometric fuel-air ratio for part throttle engine operation and a rich fuel-air ratio for full throttle engine operation.

It is an important object of the present invention to provide fluidic fuel injection apparatus for a reciprocating engine wherein injected fuel is controlled by pure fluid control apparatus responsive to engine exhaust gas temperature to maintain said temperature at a substantially maximum value.

It is another important object of the present invention to provide fluidic fuel injection apparatus for an aircraft reciprocating engine wherein the fuel flow injected to the engine cylinders is controlled as a function of the ratio of engine exhaust gas temperature to flight altitude ambient air temperature.

BRIEF DESCRIPTION OF THE DRAWINGS

FIG. 1 is a schematic representation of a reciprocating engine and fuel injection system therefor embodying the present invention wherein fuel and air portions are represented in block form with appropriate supply and drain vents shown;

FIG. 2 is a schematic representation of the pure fluid control circuitry including pure fluid amplifiers of the oscillating, monostable, bistable and proportionally acting types embodied in the present invention;

FIG. 3 is a truth table describing conditions of operation of various identified pure fluid amplifiers in response to various identified conditions of fuel flow and exhaust gas temperature;

FIG. 4 represents a conventional monostable pure fluid amplifier;

FIG. 5 represents a conventional bistable pure fluid amplifier;

FIG. 6 represents a conventional proportional acting pure fluid amplifier;

FIG. 7 represents a conventional oscillator pure fluid amplifier; and

FIG. 8 represents a plot of fuel-air ratio, $\frac{W_f}{W_a}$, versus exhaust gas temperature, EGT.

DESCRIPTION OF THE PREFERRED EMBODIMENT

Referring to FIG. 1, numeral 20 designates a conventional combustion engine of the reciprocating type provided with an air induction manifold 22 suitably connected to supply air-to-air intake valves 24 each of which, in turn, control air flow to an associated engine cylinder 26. Two engine cylinders 26 are shown of a six cylinder engine but the present invention may be adapted for use with engines of more or less cylinders as desired. Each engine cylinder is provided with a fuel injection nozzle 28 suitably connected to project through the wall of manifold 22 and inject pressurized fuel therein at a point in the air flow upstream from valve 24 such that a resulting fuel air mixture is available for passage through valve 24 when opened to charge associated cylinder 26.

An air inlet 30 of manifold 22 is provided with a positionable throttle valve 32, the position of which determines the mass air flow drawn through manifold 22 for consumption by cylinders 26.

The engine 20 is preferably of the aircraft type and may be provided with a conventional variable pitch propeller, not shown, suitably connected to be controlled by a propeller pitch control lever which is pilot controlled.

An exhaust gas manifold 38 is suitably connected to engine 20 to receive exhaust gas from cylinders 26 via associated exhaust valves 40 and discharge same to the atmosphere.

A pilot operated throttle lever 42 suitably connected to air throttle valve 32 for positioning the same, controls the engine power output.

As viewed in FIG. 1, the left-hand portion of the fuel injection system including block 44 represents a fuel flow circuit and the right-hand portion including blocks 46, 48 and 50 represents an air flow circuit. The fuel flow circuit includes a fuel tank 52 connected to supply boost pump 54 which, in turn, discharges fuel at a relatively low-boost pressure $P_o$ to an engine driven main fuel pump 56 which, in turn, discharges fuel at increased pressure to supply fuel conduit 58. The fuel pressure $P_1$ in supply conduit 58 is maintained at a predetermined value by a conventional pressure regulating valve generally indicated by 60 and connected in flow controlling relationship with a fuel return conduit 62 leading from supply conduit 58 to the inlet side of pump 56 at relatively lower boost pressure $P_o$. A plurality of proportionally acting pure fluid amplifiers generally indicated by $A_5$ and $A_6$ in block 44 are connected to receive fuel at pressure $P_1$ from conduit 58 and divide the same into two separate flow paths corresponding to conduits 64 and 66 which, in turn, communicate with fuel return conduit 62 at pressure $P_o$ and a flow divider 68, respectively. The flow divider 68 divides the fuel flow supplied thereto equally between a plurality of fuel lines 70 each of which communicate with an associated fuel injection nozzle 28.

The air flow circuit includes a plurality of sub circuits defined by pure fluid amplifiers generally indicated by $A_1$, $A_2$ and $A_3$ in block 46, a plurality of amplifiers generally indicated by $A_8$, $A_9$, $A_{10}$, $A_{11}$ and $A_{12}$ in block 48, and a plurality of amplifiers $A_4$, and $A_7$ in block 50. Amplifiers $A_1$, $A_2$ and $A_3$ are vented to the atmosphere at pressure $P_a$ via supply conduit 72 whereas amplifiers $A_8$, $A_9$, $A_{10}$, $A_{11}$ and $A_{12}$ may be vented to the atmosphere via supply conduit 74 and amplifiers $A_4$ and $A_7$ vented to the atmosphere via conduit 76. Supply conduits 74 and 76 are selectively blocked depending upon the position of a spool valve 78 connected to be actuated in response to a pilot actuated switch or engine speed as related to the speed of a variable pitch propeller, not shown. As shown, valve 78 has two spaced apart lands 80 and 82. Supply conduit 74 may be blocked by land 80 while supply conduit 76 is vented to atmospheric air or the reverse may occur. When valve 78 is actuated to the left from the position shown, land 82 blocks supply conduit 76 and land 80 vents supply conduit 74 to atmospheric air.

Air flow through the various pure fluid amplifiers is generated by an engine driven vacuum pump 84 which is suitably vented to outlet conduits 86, 88 and 90 which, in turn, are vented to output passages of amplifiers $A_1$, $A_2$, $A_3$ in block 46, amplifiers $A_8$, $A_9$, $A_{10}$, $A_{11}$ and $A_{12}$ in block 48 and amplifiers $A_4$ and $A_7$ in block 50, respectively. The $P_a$–$P_r$ pressure differential across pump 84 may be maintained constant by suitable pressure regulating valve mechanism generally indicated by 91.

Referring to FIG. 4, a conventional monostable fluid amplifier 92 includes an inlet 94 connected to a source of pressurized fluid such as atmospheric air at pressure $P_a$ and adapted to discharge a fluid power jet 96 to a fluid interaction chamber 98 having an output passage 100 aligned with inlet 94 and separated from a second diverging output passage 102 by a wedge shaped flow splitter 104. The output passages 100 and 102 are vented to a pressure source which is relatively low compared to the inlet 94 pressure source and are provided with restrictions 101 and 103, respectively. The power jet 96 passes between opposing control fluid ports 106 and 108 which inject controlled relatively low-pressure fluid transversely against power jet 96 to thereby generate a corresponding fluid pressure differential thereacross. In the absence of a fluid pressure differential across power jet 96, the jet 96 will pass through interaction chamber 98 and into output passage 100 thereby producing a maximum pressure or flow differential between output passages 100 and 102. Increasing the pressure of the control fluid at port 106 relative to the control fluid at port 108 generates a pressure differential transversely across power jet 96 which deflects accordingly causing the power jet to strike splitter 104 thereby causing simultaneous pressurization of output passages 100 and 102 to a varying degree depending upon the degree of deflection of power jet 96. The resulting pressure or flow variation in either output passage 100 or 102 or differential in pressure or flow therebetween may be sensed to provide an amplified output signal as a function of the control fluid pressure differential generated between control fluid ports 106 and 108. The output signal is sensed via pressure taps 110 and 112 in output passage 100 and 102, respectively. Amplification of the output signal derived from one or both of the output passages 100 and 102 is obtained by virtue of the sensitivity of power jet 96 to relatively small pressure differential variations between control fluid ports 106 and 108.

Referring to FIG. 5, a conventional bistable fluid amplifier 114 includes inlet port 116 connected to a source of pressurized fluid such as atmospheric air and adapted to discharge a fluid power jet 118 to a fluid interaction chamber 120 having diverging air output passages 122 and 124 separated by a wedge shaped flow splitter 126 and provided with restrictions 125 and 127, respectively. The power jet 118 passes between one or more pairs of opposed control fluid ports such as 128 and 130 which may be duplicated. A control fluid pressure pulse generated at control fluid port 128 only acts transversely against power jet 118 to deflect same against the opposite wall of interaction chamber 120 against which the power jet 118 becomes attached by virtue of the well known "Coanda effect" thereby directing power jet 118 into output passage 124 only. The pulse at control fluid port 128 may dissipate and the power jet 118 remains attached to the wall until a pressure pulse occurs at control fluid port 130 only which causes the power jet 118 to deflect to the opposite wall of interaction chamber 120 against which the jet 118 becomes attached causing the same to pass to output passage 122 only and remain in that state upon dissipation of the pulse at control port 130. Alternate pressure pulses at control port 128 and 130 causes the power jet 118 to deflect in the above-mentioned manner thereby alternately pressurizing output passages 122 and 124 accordingly. If equal pressure pulses occur simultaneously at control fluid ports 128 and 130, the pulse effects cancel and the power jet 118 remains in its position. The resulting output signals generated in output passages 122 and 124 are sensed via associated pressure taps 132 and 136 respectively. As in the case of the monostable amplifier of FIG. 4, the output passages 122 and 124 are vented to a pressure source which is relatively low compared to the inlet port 116 pressure source.

Referring to FIG. 6, a conventional proportionally acting pure fluid amplifier 138 is provided with an inlet port 140 connected to a source of pressurized fluid such as atmospheric air and adapted to discharge a fluid power jet 142 to a fluid interaction chamber 144 having diverging output passages 146 and 148 separated by a wedge shaped flow splitter 147 and provided with restrictions 149 and 145, respectively. The apex of splitter 147 is aligned with port 140 to intercept power jet 142 and separate the same into equal portions for passage for output passages 146 and 148. The power jet 142 passes between one or more pairs of opposed control fluid ports such as 150 and 152 which may be duplicated. A control fluid pressure differential resulting from unequal control fluid pressures generated at control ports 150 and 152 acts transversely against power jet 142 causing the same to deflect toward output passage 146 or 148 depending upon which control port 150 or 152 exhibits the predominating fluid pressure. The degree of deflection of power jet 142 and thus the differential flow to output passages 146 and 148 produces an amplified pressure differential therebetween in proportion to the control pressure differential between control ports 150 and 152. Passages 146 and 148 are provided with pressure taps 151 and 153, respectively.

Referring to FIG. 7, a conventional pure fluid amplifier of the oscillating type 154 includes an inlet port 156 connected to a source of pressurized fluid such as the atmosphere and adapted to discharge a fluid power jet 158 to a fluid interaction chamber 160 having diverging output passages 162 and 164 separated by a wedge shaped splitter 163 suitably aligned with inlet port 156 such that the undisturbed power jet 158 discharged therefrom is directed to output passage 162 in entirety. Restrictions 165 and 167 are provided in output passages 162 and 164, respectively. A portion of the flow directed to output passage 162 passes into a feedback passage 166 connecting output passage 162 with a control fluid port 168 which, in turn, is pressurized accordingly causing the power jet 158 to deflect to the opposite wall of interaction chamber 160 whereupon the power jet 158 is directed to output passage 164. A portion of the power jet 158 passing to output passage 164 passes into a feedback passage 170 connecting output passage 164 with a control fluid port 172 which opposes control fluid port 168. The resulting pressurization of control port 172 and simultaneous depressurization of opposing control port 168 causes power jet 158 to deflect and pass into output passage 162. The above-described sequence is continuously repeated as long as the power jet 158 exists thereby providing amplified pressurization of output passages 162 and 164 and thus a series of pressure pulses at either output passage 162 or 164 having a frequency corresponding to the feedback pulses arriving at control ports 168 and 172. The frequency may be established as desired by lengthening or shortening the feedback passages 166 and 170 to decrease or increase, respectively, the pulse frequency. As in the case of amplifiers 92, 114 and 138, the output passages 162 and 164 of amplifier 154 are vented to a pressure source which is relatively low compared to the pressure source of inlet port 156. It will be recognized that the frequency also varies as a function of the temperature of the fluid passing through feedback passages 166 and 170. Increased temperature of the fluid increases pulse frequency thereby making the oscillator 154 useful as a temperature sensor. Passages 162 and 164 are provided with pressure taps 171 and 173, respectively.

Referring to FIG. 2, the various pure fluid amplifiers disclosed therein are shown in schematic form and, with reference to FIGS. 4, 5, 6 and 7, will be identified by type. As indicated in FIG. 1, all of the amplifiers in the circuits of FIG. 2, with the exception of one amplifier vented to air induction manifold pressure, $P_M$, and two amplifiers in the fuel flow circuit are arranged to selectively have their respective inlet ports connected to the atmosphere and respective output passages connected to the engine driven vacuum pump 84.

Oscillating amplifier $A_1$ is exposed to atmospheric air at temperature $T_A$ and provided with feedback passages 174 and 176 of equal length resulting in output pressure pulses at control ports 175 and 177 and thus output passages 178 and 180 thereof having a fixed frequency depending upon the temperature $T_A$.

A bistable amplifier $A_2$ having opposed control ports 182 and 184 connected to feedback passages 174 and 176, respectively, via equivalent passages 186 and 188 responds to the pulses generated by amplifier $A_1$ and produces a corresponding alternate pressurization of output passages 190 and 192. Pressure pulses in output passages 190 and 192 are transmitted through passages 194 and 196, respectively, to control ports 198 and 200 of a monostable amplifier $A_3$. Passage 194 is partially exposed to atmospheric air at temperature $T_A$ and partially exposed to engine exhaust gas at temperature $T_E$. As shown, the portion of passage 194 exposed to the engine exhaust gas may be curved to adapt the same for insertion through a suitable access opening 202 in exhaust manifold 38 thereby exposing the passage 194 to the flow of exhaust gas through manifold 38. The remaining portion of passage 194 is exposed to atmospheric air at temperature $T_A$. The pressure pulses in output passage 192 are one half cycle or 180° out of phase with the pulses in output passage 190 and pass through passage 196 exposed to atmospheric air at temperature $T_A$ which passage 196 is of the same length as the portion of passage 194 exposed to atmospheric air at temperature $T_A$. Since the time taken for the pulses to travel through passages 194 and 196 is dependent upon the temperature of the air therein, it will be recognized that the pulses transmitted through passages 194 and 196 will arrive at control ports 198 and 200, respectively, at different times with the time differential therebetween dependent upon the exhaust gas temperature $T_E$ to which passage 194 is exposed.

The monostable amplifier $A_3$ has a normal stable condition wherein the fluid jet thereof is directed in entirety to output passage 204 thereof. However, the power jet is deflected toward output passage 206 thereof when a pressure pulse occurs at control port 198 and no pressure pulse occurs at control port 200. The degree of deflection of the power jet and thus the relative change in flow or pressure between output passages 204 and 206 is directly proportional to the phase shift between pressure pulses at control ports 198 and 200.

The above-described relationships may be described as follows:

(1) $\quad t = K \dfrac{L}{\sqrt{T}} \quad$ wherein L represents the length of a passage, $t$ represents the time, in seconds, required for an acoustic pulse to pass through length L, T represents the temperature of the gas in the passage of length L, and K represents a constant.

(2) $\quad f = \dfrac{1}{K} \dfrac{\sqrt{T_A}}{L} \quad$ wherein $T_A$ represents atmospheric air temperature, $f$ represents frequency in cycles/second of oscillator amplifier $A_1$, L represents the sum of the two equal length feedback passages 174 and 176 of amplifier $A_1$ and K represents a constant.

The bistable amplifier $A_2$ being slaved to the oscillator amplifier $A_1$ has an output substantially identical to that of amplifier $A_1$. The time required for a pulse from the output passage 190 of amplifier $A_2$ to pass to control port 198 of amplifier $A_3$ is determined by:

$$(3) \quad t_1 = K\left(\frac{L_1}{\sqrt{T_A}} + \frac{L_2}{\sqrt{T_E}}\right)$$

wherein $T_A$ represents atmospheric air temperature, $T_E$ represents exhaust gas temperature, $t_1$ represents travel time in seconds of the pulse, $L_1$ represents length of passage 194 exposed to atmospheric air temperature $T_A$, $L_2$ represents length of passage 194 exposed to exhaust gas temperature $T_E$ and K represents a constant.

The time required for a pulse from output passage 192 of amplifier $A_2$ to pass to control port 200 of amplifier $A_3$ is determined by:

$$(4) \quad t_2 = K\frac{L_3}{\sqrt{T_A}}$$

wherein $L_3$ represents the length of passage 196 exposed to atmospheric air temperature $T_A$, $t_2$ represents travel time in seconds of the pulse and K represents a constant.

The time differential in seconds between the two pulses is determined by:

$$(5) \quad t_1 - t_2 = K\left(\frac{L_1}{\sqrt{T_A}} + \frac{L_2}{\sqrt{T_E}} - \frac{L_3}{\sqrt{T_A}}\right)$$

Since $L_1$ is equal to $L_3$, equation 5 reduces to:

$$(6) \quad t_1 - t_2 = K\frac{L_2}{\sqrt{T_E}}$$

The time differential $t_1 - t_2$ is related to the corresponding phase shift by frequency as follows:

(7) $\Phi = 360° \ F.(t_1-t_2)$ wherein $\Phi$ represents phase shift in degrees. Substituting equations 2, 3 and 4 in equation 7 results in:

$$(8) \quad \phi = 360° \ L_2 \frac{\sqrt{T_A}}{T_E}$$

Since an initial 180° phase shift exists between the pressure pulses in output passages 190 and 192 of amplifier $A_2$, a total phase shift, $\theta$, at control ports 204 and 206 of amplifier $A_3$ is defined by:

(9) $\theta = 180° + \phi$ or by substitution of equation 8

$$(10) \quad \theta = 180 + 360° \ L_2 \frac{\sqrt{T_A}}{T_E}$$

The pressure differential between output passages 204 and 206 of amplifier $A_3$ is directly proportional to the phase shift over a 180° range and may be represented as:

(11) $\Delta P = K_1\theta$ wherein $\Delta P$ represents the pressure differential in p.s.i. between output passages 204 and 206 and $K_1$ represents a proportionality constant. Substituting equation 10 in equation 11 gives:

$$(12) \quad \Delta P = K_1 180° + K_1 360° \ L_2 \frac{\sqrt{T_A}}{T_E}$$

Thus, the pressure differential between, as well as the individual pressures derived from output passages 204 and 206 of amplifier $A_3$ becomes directly proportional to the ratio of atmospheric air temperature and exhaust gas temperature $\frac{T_A}{T_E}$.

The above-described circuit including amplifiers $A_1$, $A_2$ and $A_3$ is continuously operating during running of the engine.

The output passage 106 206 of amplifier $A_3$ is vented via a passage 208 to a control port 210 of proportionally acting amplifier $A_4$ which amplifier $A_4$ is rendered active only during full rich operation as will be described. The pulsed pressure from output passage 206 is attenuated to a control pressure of varying amplitude depending upon the pulsed pressure phase shift by providing passage 208 with a restriction 212 as well as a chamber 214 of predetermined volume vented to passage 208 downstream from restriction 212. A control port 215 opposing control port 210 is vented to a passage 216 containing restrictions 218 and 220 in series flow relationship therein. The passage 216 is supplied air at atmospheric pressure $P_A$ via passage 76 and discharges air to passage 90 at relatively lower pressure $P_r$. The pressure intermediate restrictions 218 and 220 and vented to control port 214 varies in a predetermined manner as a function of the area ratio of the restrictions 218 and 220 which restrictions may be selected to provide a reference pressure corresponding to a desired exhaust gas temperature $T_E$. Reference is made to U.S. Pat. No. 2,950,596 issued Aug. 30, 1960 to Elmer A. Haase et al. (common assignee) for specific details regarding the fluid pressure generated intermediate two series restrictions and the effect of the area ratio thereof on the intermediate pressure.

Output passage 222 of amplifier $A_4$ is vented via a passage 224 containing restriction 226 to control port 236 of proportional amplifier $A_5$. Output passage 230 of amplifier $A_4$ is vented via a passage 232 containing restriction 234 to control port 228 of proportional amplifier $A_5$. The pressure differential generated at output passages 222 and 230 and applied to amplifier $A_5$ is proportional to the input pressure differential generated at control ports 210 and 215 and therefore is proportional to the temperature error between exhaust gas temperature, $T_E$, and a reference temperature, $T_R$.

Proportional amplifier $A_5$ is supplied pressurized fuel via fuel conduit 58 and generates a fuel jet which is deflected in response to the pressure differential between control ports 228 and 236 thus pressurizing output passages 238 and 240 of amplifier $A_5$ with fuel accordingly. The output passage 238 is vented via a passage 242 to control port 244 of proportional amplifier $A_6$. The output passage 240 is vented via a passage 246 to control port 248 opposing control port 244. Proportional amplifier $A_6$ is supplied pressurized fuel via fuel conduit 58 and generates a fuel jet which is deflected in proportion to the pressure differential between control ports 244 and 248 thereby establishing a corresponding proportional division of fuel flow between output passages 250 and 252 of amplifier $A_6$. The output passage 250 is vented via a passage 254 to fuel flow divider 68 which, in turn, divides the fuel flow equally between the six fuel passages 70 for transmission to associated fuel injection nozzles 28. The output passage 252 is vented to fuel return line 64.

As will be described hereinafter, it may be desirable under certain conditions of operation to provide a predetermined bias on the temperature error pressure input signal introduced at control ports 210 and 215 of amplifier $A_4$. To that end, the amplified $A_4$ may be provided with a control port 256 which when pressurized is adapted to deflect the fluid jet toward output passage 222 thereby providing increased pressurization thereof and thus a corresponding change in pressure differential at control ports 228 and 236 of amplifier $A_5$. The control port 256 is pressurized via a passage 258 connecting the same to output passage 260 of a proportional amplifier $A_7$. Amplifier $A_7$ is provided with opposing control ports 262 and 264 which are vented to parallel air flow passages 266 and 268, respectively. Passages 266 and 268 are supplied air at atmospheric pressure $P_A$ via passage 76 and are vented to relatively lower air pressure in engine air induction manifold 22 via a passage 270. The passage 266 is provided with series restrictions 272 and 274 and the passage 268 is provided with equivalent series restrictions 276 and 278 such that air pressures are generated at control ports 262 and 264. A chamber 280 having a predetermined volumetric capacity is vented to passage 266 intermediate restrictions 272 and 274. During steady state engine operation the manifold pressure $P_M$ is substantially stable causing the air pressures generated at control ports 262 and 264 to equalize. However, in the event of an abrupt change in manifold pressure $P_M$ in response to movement of air throttle valve 32 following movement of control lever 42, the air pressure at control port 264 will change faster than the air pressure at control port 262 due to the chamber 280 depending upon the volume of the latter. The lagged pressure at control port 262 results in a transient pressure differential between control ports 262 and 264 which is proportional to the rate of change of manifold pressure $P_M$. The resulting deflection of the power jet of amplifier $A_7$ relative to output passages 260 and 261 thereof produces a corresponding proportional change in air pressure transmitted to control port 256 of amplifier $A_4$ and a corresponding variation in pressure differential at output passages 222 and 224 of amplifier $A_4$ which is imposed on control ports 228 and 236 of amplifier $A_5$. The amplifier $A_5$ responds causing the fuel jet thereof to deflect relative to output passages 238 and 240 thereby producing a corresponding variation in pressure differential at control ports 244 and 248 of amplifier $A_6$. The fuel jet of amplifier $A_6$ is deflected relative to output passages 250 and 252 thereby modifying the rate of fuel flow to flow divider 68 accordingly.

Referring to amplifier $A_3$, the output passage 204 thereof is vented via a passage 284 containing a restriction 286 to parallel passages 288 and 290. A chamber 292 of predetermined volumetric capacity is vented to passage 284 downstream from restriction 286 and together with restriction 286 is operative to attenuate the pulsed pressure output from output passage 204 to a control pressure of varying amplitude depending upon the pulsed pressure phase shift. The passages 288 and 290 are vented to passage 90 at relatively low air pressure $P_r$. Passage 288 contains series restrictions 292 and 294 and passage 290 contains series restrictions 296 and 298. A chamber 300 of predetermined volumetric capacity is vented to passage 288 intermediate restrictions 292 and 294. The passage 288 intermediate restrictions 292 and 294 is vented to control port 302 of bistable amplifier $A_8$ which is further provided with opposing control port 304 vented to passage 290 intermediate restrictions 296 and 298. The series restrictions 292, 294 and 296, 298 are selected to provide equal pressures at control ports 302 and 304, respectively, in response to the common pressure differential across passages 288 and 290. In the event of a variation in said common pressure differential resulting, for example, from an increase in pressure supplied by passage 284, the pressure at control port 304 increases immediately whereas the pressure at control port 302 increases relatively slower by virtue of the chamber 300 depending upon the rate of change of pressure derived from passage 284 which is a function of engine exhaust temperature thereby generating a corresponding temporary pressure differential between control ports 302 and 304 which is a function of the rate of change of engine exhaust temperature.

The output passage 305 of amplifier $A_8$ drains to relatively low air pressure $P_r$ whereas output passage 306 is vented via passage 308 to control port 310 of monostable amplifier $A_9$ and via branch passage 312 to control port 314 of monostable amplifier $A_10$. The pressure applied at control port 310 deflects the power jet of amplifier $A_9$ toward vent passage 316 thereof resulting in corresponding control over pressure in output passage 318 which, in turn, is vented via passage 320 to control port 322 of monostable amplifier $A_11$. The opposing control port 324 of amplifier $A_11$ is vented via passage 326 to output passage 328 of monostable amplifier $A_10$ which is pressurized depending upon the pressure generated at control port 314. Output passage 329 of amplifier $A_10$ drains to relatively low air pressure $P_r$.

Output passages 330 and 332 of amplifier $A_11$ are vented via passages 334 and 336, respectively, to passage 90 at relatively low air pressure $P_r$. The passage 334 is provided with series restrictions 338 and 340 and the passage 336 is provided with series restrictions 342 and 344. Chambers 346 and 348 of equal volumetric capacity are vented to passages 334 and 336, respectively, intermediate the respective series restrictions 338, 340 and 342, 344. The chambers 346 and 348 tend to attenuate step changes in pressure derived from output passages 330 and 332, respectively, thereby causing the pressures in passages 334 and 336 to slowly increase or decrease depending upon the relative pressure changes at output passages 330 and 332. A passage 350 connects passage 334 intermediate restrictions 338 and 340 to a control port 352 of amplifier $A_5$. A passage 354 connects passage 336 intermediate restrictions 342 and 344 to a control port 356 opposing control port 352. A passage 358 connects passage 336 intermediate restrictions 342 and 344 to parallel passages 360 and 362 which are vented at opposite ends thereof to passage 90 at relatively lower air pressure $P_r$. The passage 362 is provided with series restrictions 364 and 366. The passage 360 is provided with series restrictions 368 and 370 as well as a chamber 372 vented to passage 360 intermediate restrictions 368 and 370.

A bistable amplifier $A_12$ is provided with opposing control ports 374 and 376 which are vented to passage 360 intermediate restrictions 368 and 370 and passage 362 intermediate restrictions 364 and 366, respectively. Output passage 378 of amplifier $A_12$ is vented via a passage 380 to control port 382 of amplifier $A_10$. A branch passage 384 connects passage 380 to control port 386 of amplifier $A_9$. Output passage 388 of amplifier $A_12$ vents to relatively low air pressure $P_r$. The amplifier $A_12$ operates in a manner similar to amplifier $A_8$ in that the pressure differential generated at control ports 374 and 376 thereof is established by chamber 372. A predominating pressure is generated at control port 374 following a decrease in pressure supplied by passage 358 by virtue of the pressure at control port decreasing faster than that a control port 374 whereas the predominating pressure occurs at control port 376 following an increase in pressure supplied by passage 358. The resulting effect of the pressure differential at control ports 374 and 376 is to switch the power jet of amplifier $A_12$ to one or the other of its stable positions thereby pressurizing output passage 378 accordingly. The pressure at output passage 378 is transmitted to control ports 382 and 386 of amplifiers $A_10$ and $A_9$, respectively, where corresponding pressure differentials are generated by virtue of the opposing pressurized control ports 314 and 310.

OPERATION

The above-described fuel injection system is adapted preferably for aircraft use and the following description of operation will proceed accordingly. It will be assumed that the aircraft is subject to ground operation such as taxing or takeoff in which case the engine will be supplied a rich fuel-air ratio to maintain engine cylinder head temperatures at a relatively low value.

Referring to FIG. 1, the spool valve 78 is actuated to the position shown corresponding to full rich position by suitable conventional actuating mechanism, not shown, controlled by the pilot or, in the case of a variable pitch propeller driven by the engine, automatically controlled in response to conventional propeller pitch control mechanism, not shown, at low pitch propeller operation. The land 80 of spool valve 78 blocks passage 74 which, in turn, renders amplifiers $A_8$, $A_9$, $A_10$, $A_11$ and $A_12$ inoperative whereas land 82 vents passage 76 to atmospheric air thereby providing air flow to amplifiers $A_4$ and $A_7$. As described heretofore, the proportional amplifier $A_2$ is slaved to oscillator amplifier $A_1$ and produces amplified pressure pulses at output passages 190 and 192 thereof having a predetermined frequency. The passages 194 and 196 transmit pressure pulses from output passages 190 and 192 to control ports 198 and 200, respectively, of monostable amplifier $A_3$ and, by virtue of the exposure of passage 194 to atmospheric air temperature, $T_A$, and exhaust gas temperature, $T_E$, and exposure of passage 196 to atmospheric air temperature, $T_A$, cause the pressure pulses to occur at control ports 198 and 200 with a time differential therebetween varying as a function of the ratio of exhaust gas temperature, $T_E$, to atmospheric air temperature, $T_A$. The resulting switching of the power jet of amplifier $A_3$ in response to pressurization of control ports 198 and 200 results in a corresponding periodic increase in flow or pressure from output passage 206 and simultaneous decrease in flow or pressure at output passage 198 which is proportional to the ratio of exhaust gas temperature, $T_E$, to atmospheric air temperature, $T_A$. The pulsed pressure output derived from output passage 200 is attenuated and the resulting pressure applied to control port 210 in opposition to the reference pressure corresponding to a predetermined reference temperature, $T_R$, and established at control port 215 of proportional amplifier $A_4$. The resulting pressure differential generated at output passages 222 and 230 of amplifier $A_4$ corresponds to the error between exhaust gas temperature, $T_E$, and reference temperature, $T_R$, and is impressed upon amplifier $A_5$ via control ports 228 and 236 thereof. The amplifier $A_5$ being fuel powered operates to convert the air pressure differential imposed thereon to a proportional fuel pressure differential at output passages 238 and 240 thereof. The fuel pressure differential generated at output passages 238 and 240 is transmitted to control ports 244 and 248 of fuel powered amplifier $A_6$ which, in turn, responds by increasing or decreasing the fuel flow to output passage 250 and thus to the engine as necessary to control the exhaust gas temperature, $T_E$, at the predetermined reference temperature, $T_R$. Referring to FIG. 8, the curve shown therein indicates the relationship between engine fuel-air ratio, $\frac{W_f}{W_a}$, and engine exhaust gas temperature, $T_E$, with the solid line portion thereof representing the range wherein satisfactory cylinder combustion can be expected. The reference temperature, $T_R$, and thus exhaust gas temperature may be selected by suitable selection of the series restrictions 218 and 220 of amplifier $A_4$ as mentioned heretofore.

It is possible that undesirable engine hesitation may occur in the event that the throttle valve 32 is abruptly opened in response to control lever 42 movement to request higher engine power. An anticipation of fuel flow demand changes is provided by bistable amplifier $A_7$. Under steady state engine operation, the air pressures generated at control ports 262 and 264 are equal and the power jet of bistable amplifier $A_7$ diverted accordingly away from output passage 260 thereof thereby depressurizing the control port 256 of amplifier $A_4$. Opening movement of throttle valve 32 causes an increase in manifold pressure, $P_M$, which is applied to passages 266 and 268 of amplifier $A_7$. The pressure intermediate restrictions 276 and 278 of passage 268 increases faster than the pressure intermediate restrictions 272 and 274 in passage 266 due to the chamber 280 vented to passage 266. The resulting transient pressure differential imposed at control ports 262 and 264 is proportional to the rate of change of manifold pressure, $P_M$, and causes the power jet of amplifier $A_7$, to switch to output passage 260 thereof which, in turn, results in pressurization of control port 256 of amplifier $A_4$. The power jet of amplifier $A_4$ responds to pressurization of control port 256 and is deflected accordingly toward output passage 222 thereby causing a proportional increase in pressure differential at output passages 222 and 230 thereby establishing an increase in fuel flow to the engine. The pressurization of control port 256 is temporary since the pressure differential generated at control ports 262 and 264 of amplifier $A_7$ is caused to dissipate thereby switching the power jet away from output passage 260 of amplifier $A_7$.

Now, assuming the aircraft is in flight and cruise operation is desired, the spool valve 78 is actuated to the best power position whereby land 82 blocks passage 76 and land 80 vents passage 74 to the atmosphere thereby rendering amplifiers $A_4$ and $A_7$ inoperative and amplifiers $A_8$ through $A_{12}$ operative. The pressure derived from output passage 204 of amplifier $A_3$ is applied to passages 288 and 290 of bistable amplifier $A_8$ which applied pressure, if substantially stable, results in equal pressures at control ports 302 and 304 by virtue of the equivalent series restrictions 292, 294 and 296, 298 network. The pressure at control port 302 is modified by virtue of the chamber 300 which causes the pressure to vary as a function of the rate of change of pressure impressed on passages 288 and 290 or, in other words, rate of change of exhaust gas temperature, $T_E$. If exhaust gas temperature, $T_E$ increases causing an increase in pressure applied to passages 288 and 290, the control port 304 pressure increases faster than the opposing pressure at control port 302 causing the power jet of amplifier $A_8$ to switch to output passage 306 thereof whereas a reverse action occurs in the event of a decrease in exhaust gas temperature.

The air pressure transmitted via passage 358 from passage 336 intermediate restrictions 342 and 344 to passages 360 and 362 of amplifier $A_{12}$ is proportional to the input pressure differential generated at output passages 330 and 332 of amplifier $A_{11}$ and thus fuel flow to the engine thereby providing a pressure input representing fuel flow variations to passages 360 and 362. The pressures at control ports 374 and 376 of bistable amplifier $A_{12}$ are equalized in response to a substantially stable pressure applied by passage 358. Increasing pressure applied through passage 358 to passage 360 and 362 represents increasing fuel flow to the engine which by virtue of chamber 372, results in a pressure differential at control ports 374 and 376 causing the power jet of amplifier $A_{12}$ to switch to output passage 378 thereof whereas a reverse action occurs in the event of a decrease in the pressure applied to passages 360 and 362. The pressure differential generated at control ports 374 and 376 varies as a function of the rate of change of pressure applied to passages 360 and 362 and thus rate of change of fuel flow to the engine. The pressure generated at output passage 378 of amplifier $A_{12}$ is transmitted to control ports 382 and 386 of amplifiers $A_{10}$ and $A_9$, respectively, where it is referenced to the pressure at opposing control ports 314 and 310. The resulting pressure differentials generated at control ports 314, 382 and 310, 386 of amplifiers $A_{10}$ and $A_9$, respectively, varies in accordance with the relative rate of change of exhaust gas temperature, $T_E$, and fuel flow, $W_f$, to the engine.

Reference is made to the Truth Table of FIG. 3 for the logic operation of monostable amplifiers $A_9$, $A_{10}$ and $A_{11}$. It will be noted that an increase in exhaust gas temperature, $T_E$, when fuel flow is decreasing represents a fuel rich condition whereupon the amplifiers $A_9$, $A_{10}$ and $A_{11}$ function to maintain a reduction in fuel flow to the engine. In the event that exhaust gas temperature, $T_E$, starts to decrease when fuel flow is decreasing, the engine is in a fuel lean condition and the amplifiers $A_9$, $A_{10}$ and $A_{11}$ function to reverse the trend of fuel flow thereby causing an increase in fuel flow. The net result in fuel flow to the engine which oscillates about a maximum exhaust gas temperature, $T_E$, and thus optimum engine power operation. It will be recognized that the fuel flow oscillations may be reduced to an imperceptible level by making the rate of change of fuel flow relatively slow and utilizing highly sensitive bistable amplifiers $A_8$ and $A_{12}$. The fuel flow to the engine is therefore essential constant and equal to the minimum fuel flow required for a given engine power setting.

It may be desirable to operate on the fuel rich side of the maximum exhaust gas temperature in which case a suitable bias may be provided on the pressure differential generated at control ports 302 and 304 of amplifier $A_8$.

Altitude compensation is inherent in the above described fuel injection control network since the control network is closed loop on temperature and provides control over fuel flow as a function of engine exhaust gas temperature, $T_E$.

It will be recognized that the fuel control fluidic amplifiers $A_5$ and $A_6$ may be deleted and a conventional fuel control valve actuated by suitable fluid pressure responsive means such as a diaphragm or the like substituted therefor in which case the passages 350 and 354 as well as passages 224 and 232 would be vented to the diaphragm.

I claim:

1. Fuel control apparatus for a reciprocating engine having a controllable air supply section and an exhaust gas section, said fuel control apparatus comprising:
   fluidic amplifier means responsive to an exhaust gas condition which varies depending upon the engine combustion fuel-air ratio and operative to generate a fluid pressure signal which varies as a function of said exhaust gas condition; and fuel control means responsive to said fluid pressure signal for controlling fuel flow to and thus combustion fuel-air ratio of the engine.

2. Fuel control apparatus as claimed in claim 1 wherein: said exhaust gas condition is exhaust gas temperature.

3. Fuel control apparatus as claimed in claim 2 wherein: said fluidic amplifier means is responsive to exhaust gas temperature and further responsive to supply air temperature and operative to generate a fluid pressure signal which varies as a function of exhaust gas temperature and supply air temperature.

4. Fuel control apparatus as claimed in claim 3 wherein said fluidic amplifier means includes:
first fluidic amplifier means responsive to said exhaust gas temperature and supply air temperature and operative to generate a first fluid pressure signal which varies as a function of exhaust gas temperature and supply air temperature; and
second fluidic amplifier means responsive to said first fluid pressure signal for generating a second fluid pressure signal which varies in response to said first fluid pressure signal.

5. Fuel control apparatus as claimed in claim 4 wherein:
said first fluid pressure signal is defined by a series of fluid pressure pulses having a frequency proportional to the ratio of exhaust gas temperature to supply air temperature; and
means for attenuating said series of fluid pressure pulses.

6. Fuel control apparatus as claimed in claim 3 wherein:
said first fluidic amplifier means includes an oscillator fluidic amplifier operative to generate first and second series of fluid pressure pulses having a predetermined frequency;
a bistable fluidic amplifier having first and second opposed control ports connected to receive said first and second series of fluid pressure pulses, respectively, and operative to generate corresponding third and fourth series of fluid pressure pulses of predetermined frequency;
a monostable fluidic amplifier having third and fourth opposed control ports;
a first passage having one portion of the length thereof exposed to exhaust gas temperature and the remaining portion thereof exposed to supply air temperature and connected to transmit said third series of fluid pressure pulses from said bistable fluidic amplifier to said third control port; and
a second passage of the same length as said remaining portion of said first passage and exposed to supply air temperature and connected to transmit said fourth series of fluid pressure pulses from said bistable amplifier to said fourth control port.

7. Fuel control apparatus as claimed in claim 6 wherein: said first fluid pressure signal is derived from said monostable amplifier and varies in proportion to the phase shift between said third and fourth series of pressure pulses which phase shift varies in accordance with the relationship $180° + 360°$ $L_2\sqrt{T_A/T_E}$ wherein $L_2$ represents said length of passage exposed to exhaust gas temperature, $T_E$ represents exhaust gas temperature and $T_A$ represents supply air temperature.

8. Fuel control apparatus as claimed in claim 4 wherein: said first and second fluidic amplifier means are provided with inlets connected to receive atmospheric air and output air passages vented to a relatively lower pressure air source.

9. Fuel control apparatus as claimed in claim 4 wherein:
said second fluidic amplifier means includes a proportional amplifier;
means operative to generate a reference fluid pressure representing a reference temperature;
said proportional amplifier being responsive to said first fluid pressure signal and said reference fluid pressure and operative to generate said second fluid pressure signal in the form of a fluid pressure differential proportional to and depending upon the relative error between said first fluid pressure signal and said reference fluid pressure; and
said fuel control means including fuel powered proportional amplifier means responsive to said fluid pressure differential and operative to generate a flow of fuel to said engine which varies in proportion to said fluid pressure differential to maintain said exhaust gas temperature at a substantially constant value corresponding to said reference temperature.

10. Fuel control apparatus as claimed in claim 4 wherein said second fluidic amplifier means includes:
a first series of fluidic amplifiers;
means operative to generate a reference fluid pressure signal representing a reference temperature;
said first series of fluidic amplifiers operatively connected to respond to said first fluid pressure signal and said reference fluid pressure signal and generate said second fluid pressure signal which varies in accordance with the relative error between exhaust gas temperature and said reference temperature;
a second series of fluidic amplifiers;
means operative to generate a fluid pressure signal which varies in accordance with fuel flow to the engine;
said second series of fluidic amplifiers operatively connected to respond to said first fluid pressure signal and said fuel flow pressure signal and generate said second fluid pressure signal which varies depending upon the relative change in exhaust gas temperature for a change in fuel flow to the engine; and
control means operatively connected to said first and second series of fluidic amplifiers for rendering one of said first and second series of amplifiers inoperative depending upon engine operating conditions.

11. Fuel control apparatus as claimed in claim 10 wherein: said first series of fluidic amplifiers is operative to control fuel flow to the engine to maintain a substantially constant engine combustion fuel-air ratio and thus exhaust gas temperature regardless of variations in air flow to the engine.

12. Fuel control apparatus for a reciprocating engine having a controllable air supply as claimed in claim 10 wherein said air supply to the engine is controlled by an air throttle valve and said fuel control apparatus further includes:
fluidic amplifier means responsive to air pressure downstream from the air throttle valve and operative to generate a third fluid pressure signal which varies in proportion to the rate of change of said air pressure; and
said third fluid pressure signal being imposed on said first series of fluidic amplifiers to effectively modify said second fluid pressure signal thereby providing an anticipation of fuel flow variation.

13. Fuel control apparatus as claimed in claim 4 wherein:
said supply air is at substantially atmospheric air temperature; and
said first fluid pressure signal varies as a function of the ratio of atmospheric air temperature to exhaust gas temperature.

14. Fuel control apparatus as claimed in claim 4 wherein:
said first and second fluidic amplifier means are powered by pressurized air and said second fluid pressure signal is derived from said pressurized air;
said fuel control means include first and second proportional fluidic amplifiers powered by pressurized fuel;
said first proportional fluidic amplifier being responsive to said second fluid pressure signal derived from air and operative to generate a control fuel pressure differential in proportion to said second fluid pressure signal; and
said second proportional fluidic amplifier being responsive to said control fuel pressure differential and operative to generate a flow of fuel to the engine which varies in proportion to said control fuel pressure.

15. Fuel control apparatus as claimed in claim 10 wherein:
said means operative to generate a fluid pressure signal which varies in accordance with fuel flow to the engine includes:
a first bistable fluidic amplifier having first and second control fluid ports and first and second output fluid passages;
first and second fluid passages connected to receive said second fluid pressure signal and vented to a relatively lower pressure fluid source;
a first pair of restrictions having a predetermined area ratio in said first fluid passage in series flow relationship;
a second pair of restrictions having a predetermined area ratio in said second passage in series flow relationship;
a chamber having a predetermined volumetric capacity vented to said first passage intermediate said first and second restrictions;
said first and second control ports being vented to said first and second fluid passages, respectively, intermediate the pair of restrictions associated therewith for generating a first control fluid pressure differential which varies as a function of the rate of change of said fluid pressure signal representing fuel flow to the engine to thereby pressurize said first output passage accordingly; and
said second series of fluidic amplifiers includes;
a second bistable amplifier having third and fourth control ports and third and fourth output fluid passages;
third and fourth fluid passages connected to receive said first fluid pressure signal and vented to said relatively lower pressure fluid source;
a third pair of restrictions having a second predetermined area ratio in said third passage in series flow relationship;
a fourth pair of restrictions having said second predetermined area ratio in said fourth passage in series flow relationship;
a chamber having a predetermined volumetric capacity vented to said third passage intermediate said third pair of restrictions;
said third and fourth control ports being vented to said third and fourth fluid passages, respectively, intermediate the pair of restrictions associated therewith for generating a second control fluid pressure differential which varies as a function of the rate of change of said first fluid pressure signal to thereby pressurize said third output fluid passage accordingly; and
a plurality of monostable fluidic amplifiers operatively connected to said first and third output passages and responsive to the fluid pressure differential therebetween for generating said second fluid pressure signal.

16. Fuel control apparatus as claimed in claim 6, wherein;
said oscillator fluidic amplifier is bistable and air powered to provide a power air jet deflectable between first and second output passages to provide alternate pressurization thereof;
first and second control ports arranged in opposing relationship transversely relative to said power jet;
a first feedback passage connecting said first output passage and said first control port;
a second feedback passage connecting said second output passage and said second control port; and
said first and second feedback passages being exposed to atmospheric air temperature and operative to transmit said first and second series of pressure pulses to said first and second control ports, respectively, at a frequency which varies as a function of atmospheric air temperature.